United States Patent
Kim et al.

(10) Patent No.: US 7,880,832 B2
(45) Date of Patent: Feb. 1, 2011

(54) POLARIZING PLATE, DISPLAY PANEL HAVING THE SAME, AND DISPLAY DEVICE HAVING THE SAME

(75) Inventors: Joong-Hyun Kim, Suwon-si (KR);
Jin-Sung Choi, Cheonan-si (KR);
Jeong-Hwan Lee, Suwon-si (KR);
Seung-Mo Kim, Cheonan-si (KR);
Jin-Mi Jung, Seoul (KR); Kang-Woo Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 176 days.

(21) Appl. No.: 11/931,615

(22) Filed: Oct. 31, 2007

(65) Prior Publication Data

US 2008/0106672 A1    May 8, 2008

(30) Foreign Application Priority Data

Nov. 2, 2006    (KR)    ............... 10-2006-0107527

(51) Int. Cl.
*G02F 1/1335* (2006.01)
*G02B 5/30* (2006.01)

(52) U.S. Cl. ......................... 349/96; 359/486
(58) Field of Classification Search ............. None
See application file for complete search history.

(56) References Cited

U.S. PATENT DOCUMENTS

| | | | | |
|---|---|---|---|---|
| 6,122,103 | A * | 9/2000 | Perkins et al. | 359/486 |
| 6,788,461 | B2 * | 9/2004 | Kurtz et al. | 359/486 |
| 6,813,077 | B2 * | 11/2004 | Borrelli et al. | 359/486 |
| 2004/0109106 | A1 * | 6/2004 | Yang et al. | 349/69 |
| 2004/0125449 | A1 * | 7/2004 | Sales | 359/486 |
| 2004/0174596 | A1 | 9/2004 | Umeki | |
| 2005/0046943 | A1 | 3/2005 | Suganuma | |
| 2005/0122588 | A1 | 6/2005 | Kunisada et al. | |
| 2005/0128587 | A1 * | 6/2005 | Suganuma | 359/486 |
| 2005/0190445 | A1 | 9/2005 | Fukuzaki | |
| 2006/0118514 | A1 | 6/2006 | Little et al. | |

(Continued)

FOREIGN PATENT DOCUMENTS

AL    1 691 219 A1    8/2006

(Continued)

OTHER PUBLICATIONS

European Office Action; Feb. 20, 2008; 070214150-2217 All references cited in the Foreign Office Action and not previously submitted are listed above.

(Continued)

*Primary Examiner*—Mike Stahl
(74) *Attorney, Agent, or Firm*—Cantor Colburn LLP

(57) ABSTRACT

A polarizing plate includes a base layer, a buffer layer and a plurality of conductive lattice lines. The buffer is formed on the base layer. The conductive lattice lines are formed on the buffer layer in a stripe shape to reflect and polarize incident light. The buffer layer protects the conductive lattice lines. The conductive lattice lines include a silver (Ag) layer or an aluminum (Al) layer. Therefore, the buffer layer protects the conductive lattice lines, so that the lifetime of the polarizing plate may be increased. Furthermore, the display quality of a display panel and a display device having the polarizing plate may be enhanced.

13 Claims, 11 Drawing Sheets

U.S. PATENT DOCUMENTS

| | | | |
|---|---|---|---|
| 2006/0119937 A1* | 6/2006 | Perkins et al. | 359/486 |
| 2006/0262397 A1* | 11/2006 | Lee et al. | 359/486 |
| 2007/0076143 A1* | 4/2007 | Palk et al. | 349/96 |
| 2007/0087549 A1* | 4/2007 | Yamaki et al. | 438/613 |
| 2007/0242195 A1* | 10/2007 | Kuan et al. | 349/113 |
| 2007/0242352 A1* | 10/2007 | MacMaster | 359/486 |
| 2007/0285598 A1* | 12/2007 | Hwang et al. | 349/96 |
| 2008/0037094 A1* | 2/2008 | Hwang et al. | 359/238 |

FOREIGN PATENT DOCUMENTS

| | | |
|---|---|---|
| EP | 1691219 | 8/2006 |

OTHER PUBLICATIONS

European Search Report dated: Apr. 2, 2008; Application No. 07021415.0-2217.

European Examination Report dated Feb. 16, 2010 in corresponding EP Application No. 07 021 415.0 All references cited in the Report were provided/cited in previously-filed Information Disclosure Statements for the instant application.

* cited by examiner

POLARIZING PLATE, DISPLAY PANEL HAVING THE SAME, AND DISPLAY DEVICE HAVING THE SAME

This application claims priority to Korean Patent Application No. 2006-107527, filed on Nov. 2, 2006, and all the benefits accruing therefrom under 35 U.S.C. §119, the contents of which in its entirety are herein incorporated by reference.

BACKGROUND OF THE INVENTION

1. Field of the Invention

The present invention relates to a polarizing plate, a display panel having the polarizing plate, and a display device having the polarizing plate. More particularly, the present invention relates to a polarizing plate limiting a reduction of a polarized transmission rate over time, a display panel having the polarizing plate, and a display device having the polarizing plate.

2. Description of the Related Art

Generally, a liquid crystal display ("LCD") device includes an LCD panel and a backlight assembly. The LCD panel includes a thin-film transistor ("TFT") substrate, a color filter substrate and a liquid crystal layer interposed between the TFT substrate and the color filter substrate. The LCD panel does not self-emit light, so that the backlight assembly mainly influences the luminance of an image that is displayed on the LCD panel.

The LCD device further includes two polarizing plates disposed on and under the LCD panel so that the liquid crystal layer serves as a light shutter. The polarizing plate transmits light polarized in a predetermined direction. For example, the polarizing plate is theoretically capable of transmitting about 50% of light generated by the backlight assembly. However, practically, about 43% of the light generated by the backlight assembly is transmitted because of light lost at the polarizing plate.

Furthermore, manufacturing costs of the polarizing plate take up about 25% to about 30% of total manufacturing costs of the LCD panel having the polarizing plate, thereby increasing the manufacturing costs of the LCD device.

When, a conductive lattice pattern has a plurality of conductive lattice lines that are arranged in a stripe shape and have a nano-sized width and a nano-sized pitch, the conductive lattice pattern has a reflecting capacity and a degree of polarization substantially the same as a dual brightness enhancement film ("DBEF"). However, the conductive lattice pattern has a polarizing degree of about 1,000:1, which is higher than a polarizing degree of the DBEF. Thus, the conductive lattice pattern is capable of replacing a conventional polarizing plate.

The conductive lattice lines of the conductive lattice pattern are formed on a base layer such as a glass substrate, polyethylene terephthalate ("PET"), etc. The conductive lattice lines may be formed using a material having a relatively high light-reflecting rate and a relatively low light-absorbing rate such as silver (Ag), aluminum (Al), etc.

However, when a polarizing plate having the conductive lattice lines formed thereon is used for a long time, high-energy light such as ultraviolet ("UV") light is absorbed so that the temperature of the conductive lattice lines is increased. As a result, an adhesive force of the conductive lattice lines and the base layer may be decreased, and a light-reflecting rate of the conductive lattice lines may be decreased. Therefore, a polarized transmission rate of the polarizing plate may be decreased and the lifetime of the polarizing plate may be reduced.

BRIEF SUMMARY OF THE INVENTION

The present invention provides a polarizing plate including a buffer layer that protects a plurality of conductive lattice lines.

The present invention also provides a display panel including the polarizing plate.

The present invention also provides a display device including the polarizing plate.

In exemplary embodiments of the present invention, a polarizing plate includes a base layer, a buffer layer and a plurality of conductive lattice lines. The buffer layer is formed on the base layer. The conductive lattice lines are formed on the buffer layer in a stripe shape. The conductive lattice lines reflect and polarize incident light. The buffer layer protects the conductive lattice lines.

In an exemplary embodiment, the conductive lattice lines may include a silver (Ag) layer or an aluminum (Al) layer. The buffer layer may include a metal layer or an organic material layer. The metal layer may include at least one of a titanium (Ti) layer, a tungsten (W) layer, a niobium (Nb) layer, a tantalum (Ta) layer, a vanadium (V) layer, and a chromium (Cr) layer. The organic material layer may include at least one of a silicon oxide ($SiO_2$) layer, a silicon nitride ($SiN_x$) layer, a thermosetting resin layer and a light curable resin layer. The buffer layer may include a chromium oxide ($CrO_x$) layer. In an exemplary embodiment, the buffer layer may be patterned along the conductive lattice lines. In another exemplary embodiment, the buffer layer may be substantially fully formed on the base layer. The buffer layer may have a thickness of about 0.1 nm to about 10 nm. The base layer may include at least one of a polyethylene terephthalate ("PET") layer, a polyethylene naphthalate ("PEN") layer, a co-polyethylene terephthalate ("co-PET") layer, a co-polyethylene naphthalate ("co-PEN") layer and a glass layer. A pitch between the conductive lattice lines, a width of the conductive lattice lines and a thickness of the conductive lattice lines may be about 100 nm to about 200 nm, about 50 nm to about 100 nm, and about 150 nm to about 250 nm, respectively. The buffer layer may adhere the conductive lattice lines to the base layer, and the buffer layer may protect the conductive lattice lines from ultraviolet light.

In other exemplary embodiments of the present invention, a display panel includes an array substrate, an opposite substrate, a liquid crystal layer and a first polarizing part. The array substrate has a plurality of pixel parts formed thereon. The opposite substrate has a plurality of color filter parts facing the pixel parts. The liquid crystal layer is interposed between the array substrate and the opposite substrate. The first polarizing part includes first conductive lattice lines and a first buffer layer. The first conductive lattice lines are formed on the array substrate in a stripe shape to reflect and polarize incident light. The first buffer layer is formed between the array substrate and the first conductive lattice lines to protect the first conductive lattice lines.

In an exemplary embodiment, the first conductive lattice lines may be formed on a lower surface of the array substrate, and the first buffer layer may be disposed between the lower surface of the array substrate and the first conductive lattice lines. In another exemplary embodiment, the first conductive lattice lines may be formed on an upper surface of the array substrate, and the first buffer layer may be disposed between the upper surface of the array substrate and the first conductive lattice lines.

The display panel may further include a second polarizing part including second conductive lattice lines and a second buffer layer. The second conductive lattice lines may be formed on the opposite substrate in a stripe shape to reflect and polarize incident light. The second buffer layer may be disposed between the opposite substrate and the second conductive lattice lines to protect the second conductive lattice lines. In an exemplary embodiment, the second conductive lattice lines may be formed on an upper surface of the opposite substrate, and the second buffer layer may be disposed between the upper surface of the opposite substrate and the second conductive lattice lines. In another exemplary embodiment, the second conductive lattice lines may be formed on a lower surface of the opposite substrate, and the second buffer layer may be disposed between the lower surface of the opposite substrate and the second conductive lattice lines.

In still other exemplary embodiments of the present invention, a display device includes a display panel, a backlight section and a first polarizing plate. The display panel includes an array substrate, an opposite substrate and a liquid crystal layer. The array substrate has a plurality of pixel parts formed thereon. The opposite substrate has a plurality of color filter parts facing the pixel parts. The liquid crystal layer is interposed between the array substrate and the opposite substrate. The backlight section provides the array substrate with light. The first polarizing plate includes a first base layer, a plurality of first conductive lattice lines and a first buffer layer. The first base layer is disposed between the backlight part and the array substrate. The first conductive lattice lines are formed on the first base layer. The first buffer layer is formed between the first base layer and the first conductive lattice lines to protect the first conductive lattice lines.

In an exemplary embodiment, the display device may further include a second polarizing plate including a second base layer, a plurality of second conductive lattice lines, and a second buffer layer. The second base layer is disposed on the opposite substrate. The second conductive lattice lines are formed on the second base layer. The second buffer layer is disposed between the second base layer and the second conductive lattice lines to protect the second conductive lattice lines.

According to the polarizing plate, the display panel having the polarizing plate and the display device having the polarizing plate, a buffer layer protects conductive lattice lines, so that the lifetime of the polarizing plate may be increased. Furthermore, the display quality of the display panel and display device may be enhanced.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

Figure 1:
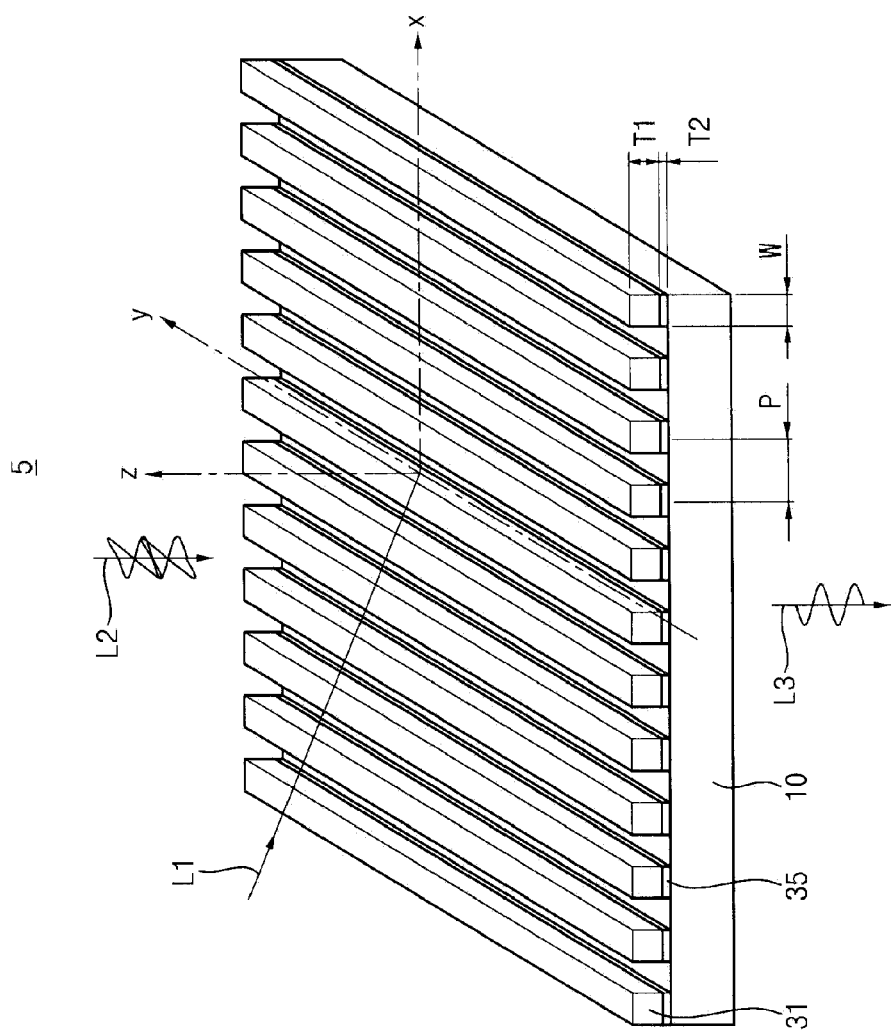
FIG. 1 is a perspective view illustrating an exemplary polarizing plate according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Polarizing Plate

FIG. 1 is a perspective view illustrating an exemplary polarizing plate according to an exemplary embodiment of the present invention.

Referring to FIG. 1, a polarizing plate 5 includes a base layer 10, a conductive lattice pattern, such as a plurality of conductive lattice lines 31, and a buffer layer 35.

The base layer 10 may be formed of a material with optically isotropic properties, heat-stable properties and chemically stable properties. Examples of the material that may be used for the base layer 10 include polyethylene terephthalate ("PET"), polyethylene naphthalate ("PEN"), co-polyethylene terephthalate ("co-PET"), co-polyethylene naphthalate ("co-PEN"), glass, etc. These may be used alone or in a combination thereof. The base layer 10 may include a PET layer, a PEN layer, a co-PET layer, a co-PEN layer and a glass layer.

The conductive lattice lines 31 are formed on a first surface of the base layer 10. The conductive lattice lines 31 have a bar shape extended along a line. The conductive lattice lines 31 are arranged in a stripe shape, substantially in parallel with each other.

The conductive lattice lines 31 may include, for example, a metal having a relatively high reflectivity. Examples of the material that may be used for the conductive lattice lines 31 include aluminum (Al), aluminum-neodymium (Al—Nd), aluminum-molybdenum (Al—Mo), silver (Ag), copper (Cu), gold (Au), molybdenum (Mo), etc. These may be used alone or in a combination thereof. The conductive lattice lines 31 may include a material with a relatively low light-absorbing rate. In view of a superior light-reflecting rate and low light-absorbing rate, the conductive lattice lines 31 may be formed of aluminum (Al) or silver (Ag). Alternatively, the conductive lattice lines 31 may include a silver (Ag) layer and an aluminum (Al) layer.

A degree of polarization of the lattice lines 31 depends on a pitch P, a width W and a height of the lattice lines 31, denoted by T1 as the thickness of the conductive lattice lines 31. The pitch P is defined as a gap between centers of the lattice lines 31 adjacent to each other. When the lattice lines 31 need to have a degree of polarization in an excellent range of a wavelength, the pitch P may be more important. The pitch P must be smaller than a wavelength of light incident on the lattice lines 31 so that the lattice lines 31 may have a degree of polarization. If the pitch P is greater than the wavelength of the incident light, then the lattice lines 31 would serve as a diffracting lattice to diffract the incident light.

When the polarizing plate 5 serves as a substrate of a display panel, the conductive lattice lines 31 may have an excellent degree of polarization with respect to visible light because the display panel displays an image using the visible light. The wavelength range of visible light is about 400 to about 700 nm. Thus, the pitch P may be no more than about 400 nm.

When the width W of the conductive lattice line 31 is about 100 nm to about 200 nm, the pitch P may be about 100 nm to about 200 nm in view of a gap between the conductive lattice lines 31 in order to ensure a polarization of visible light. The width W of the conductive lattice line 31 may be about 50 nm to about 100 nm that is 0.5 times the pitch P.

It is desirable that a polarized transmission rate of the polarizing plate 5 be large. The polarized transmission rate is defined by a light quantity that is polarized transmitted per a total light quantity that is inputted to the polarizing plate 5. The polarized transmission rate is affected by a thickness T1 of the conductive lattice lines 31, rather than a pitch P and a line width W of the conductive lattice lines 31. The conductive lattice lines 31 may have a thickness T1 of about 150 nm to about 250 nm so as to have a large polarized transmission rate.

The polarizing plate 5 reflects and polarizes light, which is incident to a first surface of the base layer 10, or light, which is incident to an opposite surface facing the first surface. An incident light beam L1 is incident to the polarizing plate 5 at a predetermined incident angle. The incident light beam L1 with the predetermined incident angle may be simplified as a polarized light beam L2 having s-polarized light and p-polarized light components. The s-polarized light is defined by a polarized light beam having a polarization vector in parallel with a longitudinal direction of the conductive lattice lines 31, that is, a Y-axis direction, and the p-polarized light is defined by a polarized light beam having a polarization vector perpendicular to the longitudinal direction of the conductive lattice lines 31, that is, an X-axis direction.

The polarizing plate 5 reflects the s-polarized light, and transmits the p-polarized light. Therefore, a light beam L3 transmitting through the polarizing plate 5 may include a p-polarized light component. The reflected s-polarized light is reflected by a member such as an optical sheet, and is changed into a randomly polarized light beam L2. The reflected light that is the randomly polarized light beam L2 is again reflected and polarized by the polarizing plate 5. Accordingly, when the polarizing plate 5 is used, the polarizing plate 5 may perform a function of a dual brightness enhancement film ("DBEF") that is a reflective polarizing film.

In absence of a buffer layer 35, an adhesive force between the conductive lattice lines 31 including aluminum (Al) or silver (Ag) and the base layer 10 may have low durability. For example, when an incident light beam L1 is incident to the conductive lattice lines 31 and the base layer 10, the temperature of the polarizing plate 5 is increased, so that an adhesive force between the conductive lattice lines 31 and the base layer 10 may be decreased, or a light-reflecting rate of the conductive lines 31 may decrease. The incident light beam L1 that is incident to the polarizing plate 5 may include visible light and ultraviolet ("UV") light. When the conductive lattice lines 31 are exposed to UV light having high energy, the light-reflecting rate of the conductive lattice lines 31 may be decreased.

However, in exemplary embodiment, the buffer layer 35, having a thickness T2, is formed between the base layer 10 and the conductive lattice lines 31 to protect the conductive lattice lines 31. The buffer layer 35 may have a superior adhesive force with the conductive lattice lines 31 and the base layer 10. Thus, even when the buffer layer 35 is exposed to UV light for a long time, physical and chemical variations of the conductive lattice lines 31 at an interface between the conductive lattice lines 31 and the buffer layer 35 may be prevented.

In one exemplary embodiment, the buffer layer 35 may include a metal material or an organic material. In another exemplary embodiment, the buffer layer 35 may include at least one of a metal layer and an organic layer. In another exemplary embodiment, the buffer layer 35 may include a double-layer structure including the metal layer and the organic layer. The buffer layer 35 may be patterned along the conductive lattice lines 31 as shown in FIG. 1. Alternatively, the buffer layer 35 may be substantially fully formed on the base layer 10.

Figure 2:
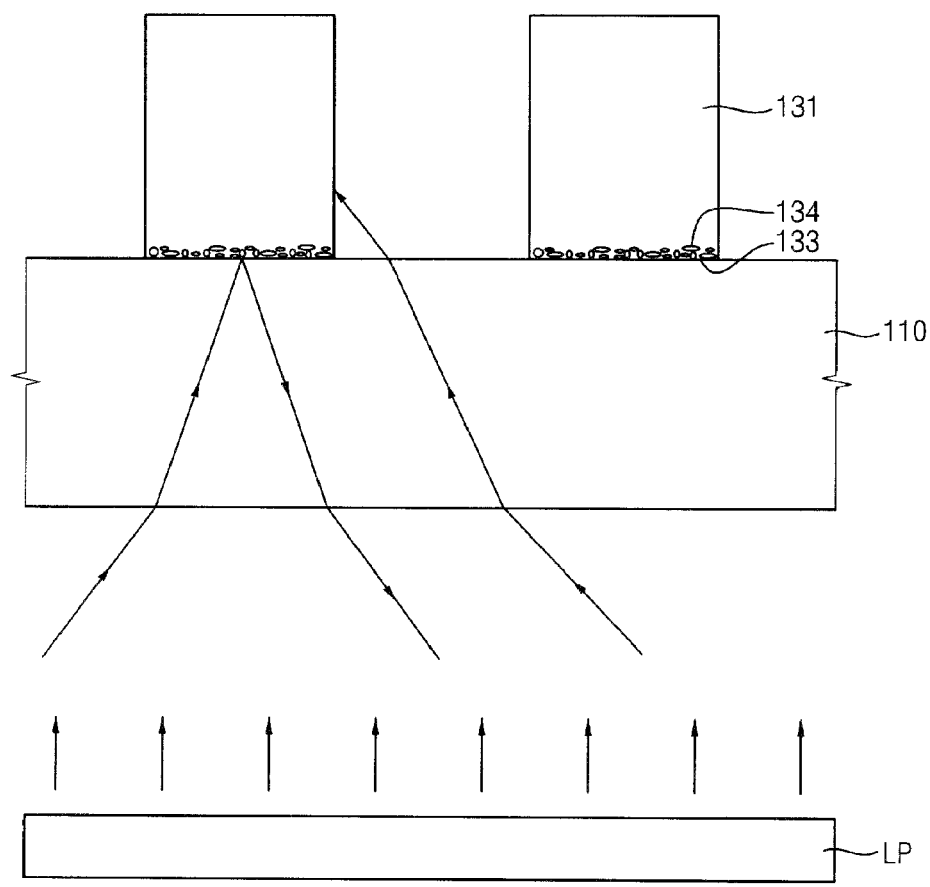
FIG. 2 is a cross-sectional view illustrating a polarizing plate according to a comparative example of the prior art.
Figure 3:
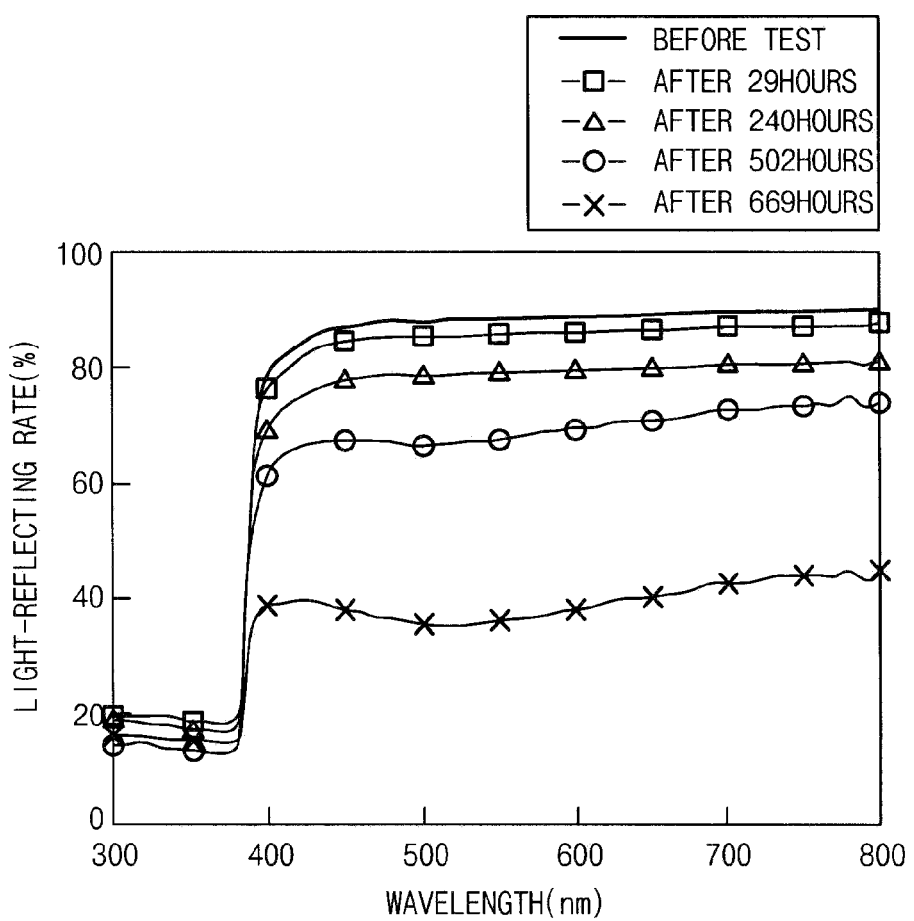
FIG. 3 is a graph showing results of an experiment including ultraviolet ("UV") light irradiation for the polarizing plate of FIG. 2.

FIG. 2 is a cross-sectional view illustrating a polarizing plate according to a comparative example of the prior art. FIG. 3 is a graph showing results of an experiment including UV light irradiation for the polarizing plate of FIG. 2.

Referring to FIG. 2, a polarizing plate according to a comparative example of the prior art includes a base layer 110 and a plurality of conductive lattice lines 131. The base layer 110 and the conductive lattice lines 131 illustrated in FIG. 2 are substantially the same as the base layer 10 and the conductive lattice lines 31 illustrated in FIG. 1. In FIG. 2, however, the conductive lattice lines 131 directly contact the first surface of the base layer 110.

In order to check for heat stability of the conductive lattice lines 131 and adhesive characteristics between the base layer 110 and the conductive lattice lines 131, an experiment including UV light irradiation was performed. For example, under conditions including an environmental temperature of 90° C., light with energy of about 500 mW/cm² was radiated at an opposite surface of the base layer 110, the light being emitted from a lamp LP, for example, a xenon (Xe) lamp emitting UV light. As a result, as shown in FIG. 3, the graph was obtained, which shows a spectrum variation of a reflected light beam according to time.

Referring to FIG. 3, it can be noted that visible light having a wavelength of no less than about 400 nm and UV light having a wavelength of no more than about 400 nm were irradiated to the base layer 110.

In an initial experiment, as indicted by the "before test" line, it can be noted that the conductive lattice lines 131 reflected about 90% of visible light and reflected about 20% of UV light. Therefore, when considering a light quantity that was transmitted through the polarizing plate 8, the conductive lattice lines 131 absorbed no more than about 10% of visible light, and absorbed no more than about 80% of UV light during an initial experiment. That is, it can be noted that much more of the UV light was absorbed by the conductive lattice lines 131 than visible light.

When a light irradiating time increased to about 29 hours, about 240 hours, about 502 hours and about 669 hours, it can be noted that a light-reflecting rate of the conductive lattice lines 131 decreased with increasing light irradiating time. In comparison with the initial experiment and after 669 hours, it can be noted that a light-reflecting rate of UV light for the conductive lattice lines 131 decreased by about 5% to about 10%, and a light-reflecting rate of visible light for the conductive lattice lines 131 decreased by no less than about 50%. For example, the light-reflecting rate of visible light for the conductive lattice lines 131 was about 40% after about 669 hours, and it can be noted that large amounts of visible light were absorbed by the conductive lattice lines 131.

In observing an interface between the conductive lattice lines 131 and the base layer 110 through a transmission electron microscope ("TEM") photograph, as schematically shown in FIG. 2, it can be noted that aluminum (Al) particles or silver (Ag) particles 134 having a size of tens of nanometers were formed in the interface 133 between the base layer 110 and the conductive lattice lines 131.

In the analysis results of a composition of the aluminum (Al) or the silver (Ag) particles 134, it can be noted that no new compounds, such as sulfuric compounds or hydrochloric compounds, were formed but an organization of the conductive lattice lines 131 was varied in the interface 133 to form aluminum (Al) particles or silver (Ag) particles 134. Furthermore, it can be noted that an adhesive force between the base layer 110 and the conductive lattice lines 131 was decreased due to the aluminum (Al) particles or the silver (Ag) particles 134.

According to the experiment results, it can be noted that a visible light absorption rate of the conductive lattice lines 131 may be greatly increased due to the aluminum (Al) particles or the silver (Ag) particles 134. Thus, the polarizing plate 8 reflects and polarizes light, like a DBEF, so that light usage efficiency may be eliminated. That is, a replacement effect of the conventional polarizing plate may be eliminated.

Figure 4:
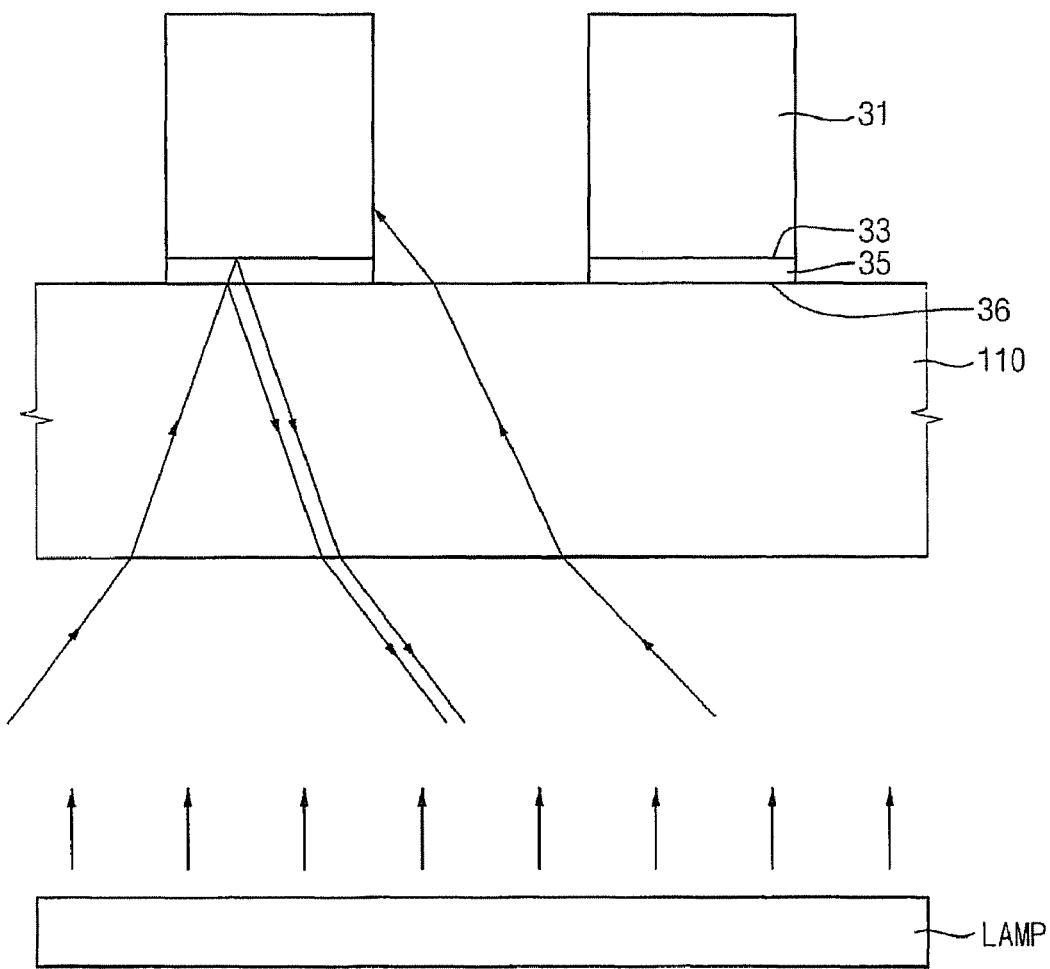
FIG. 4 is a cross-sectional view illustrating the exemplary polarizing plate of FIG. 1.
Figure 5:
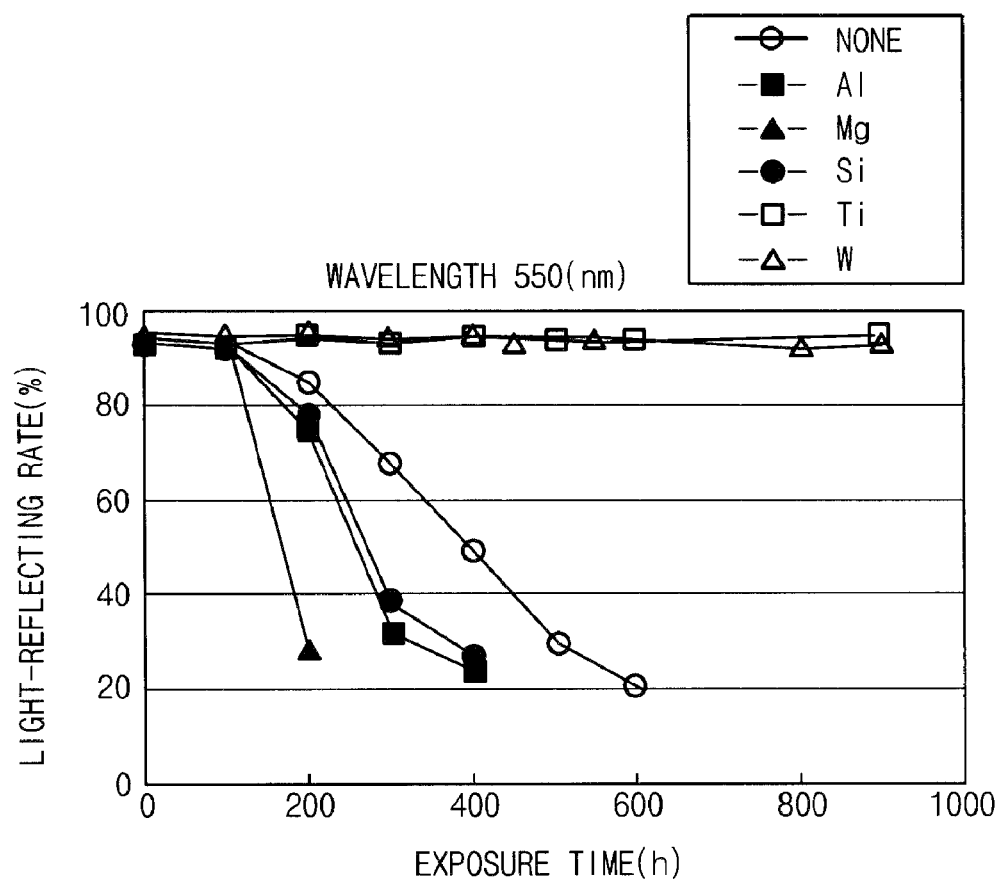
FIG. 5 is a graph showing results of an experiment including UV light irradiation for the exemplary polarizing plate of FIG. 4.

FIG. 4 is a cross-sectional view illustrating the exemplary polarizing plate of FIG. 1. FIG. 5 is a graph showing results of an experiment including UV light irradiation for the exemplary polarizing plate of FIG. 4.

Referring to FIG. 4, the conductive lattice lines 31 do not directly contact the base layer 10, and instead contact the buffer layer 35. In the present experiment, the conductive lattice lines 31 may include silver (Ag), and the buffer layer 35 includes one of aluminum (Al), magnesium (Mg), silicon oxide (SiO2), titanium (Ti) and tungsten (W). The incident light that is incident to an opposite surface of the base layer 10 is reflected at an interface 36 between the buffer layer 35 and the base layer 10, and an interface 33 between the conductive lattice lines 31 and the buffer layer 35.

In order to check for heat stability of the conductive lattice lines 31 and adhesive characteristics between the base layer 10 and the conductive lattice lines 31, an experiment including UV light irradiation was performed. For example, under conditions including an environmental temperature of 90° C., as in the experiment for the polarizing plate 8 according to the comparative embodiment as shown in FIGS. 2 and 3, light with energy of about 500 mW/cm$^2$ was radiated at an opposite surface of the base layer 10, the light being emitted from a lamp, for example, a xenon (Xe) lamp emitting UV light. As a result, as shown in FIG. 5, the graph was obtained, which shows a spectrum variation of a reflected light beam according to time for light having a wavelength of about 550 nm. In FIG. 5, a horizontal axis denotes a time during which the polarizing plate 5 is exposed to incident light.

Referring to FIG. 5, it can be noted that a spectrum variation of a reflected light beam according to time is very large in accordance with a material of the buffer layer 35. At the beginning of the experiment, it can be noted that a light-reflecting rate of the conductive lattice lines 31 was no less than about 90% regardless of a material of the buffer layer 35.

However, when the buffer layer 35 included aluminum (Al), silicon (Si) or magnesium (Mg), with an increasing radiating time to about 200 hours, about 400 hours and about 600 hours, it can be noted that a light-reflecting rate of the conductive lattice lines 31 was about 20% to about 30%.

However, when the buffer layer 35 included titanium (Ti) or tungsten (W), with an increasing radiating time, it can be noted that a light-reflecting rate of the conductive lattice lines 31 was not varied with respect to an initial light-reflecting rate.

Moreover, when the buffer layer 35 included a different metal layer, such as a niobium (Nb) layer, a tantalum (Ta) layer, a vanadium (V) layer or a chromium (Cr) layer, it can be noted that a light-reflecting rate of the conductive lattice lines 31 was superior, which was similar to cases in which the buffer layer 35 included the titanium (Ti) layer or the tungsten (W) layer.

Moreover, when the buffer layer 35 included an organic material layer, such as a silicon nitride (SiNx) layer, a silicon oxide (SiO2) layer, a thermosetting resin layer and a light curable resin layer, or a chromium oxide (CrOx) layer, it can be noted that a light-reflecting rate of the conductive lattice lines 31 was superior, which was similar to cases in which the buffer layer 35 included the titanium (Ti) layer or the tungsten (W) layer. Moreover, when the buffer layer 35 included a double-layer structure formed by the above-mentioned different materials, it can be noted that a light-reflecting rate of the conductive lattice lines 31 was superior.

In observing an interface 33 between the conductive lattice lines 31 and the buffer layer 35 and an interface 36 between the buffer layer 35 and the base layer 10 through a TEM photograph, it can be noted that silver (Ag) particles, titanium (Ti) particles or tungsten (W) particles were not found in the interfaces 33 and 36. Therefore, it can be noted that an adhesive force was not decreased in the interface 33 between the conductive lattice lines 31 and the buffer layer 35 and in the interface 36 between the buffer layer 35 and the base layer 10.

According to the experiment results, when the above-mentioned superior materials are used as or included within the buffer layer 35, it can be noted that the reflecting and polarizing characteristics may not be decreased even when the polarizing plate 5 is exposed for a long time, which has the conductive lattice lines 31 as a polarizing element.

The material of the buffer layer 35 is not limited to the above-mentioned materials. Alternatively, the buffer layer 35 may include any material having superior characteristics similar to those of titanium (Ti) and tungsten (W), as would be known to one of the ordinary skill in the art.

Figure 6:
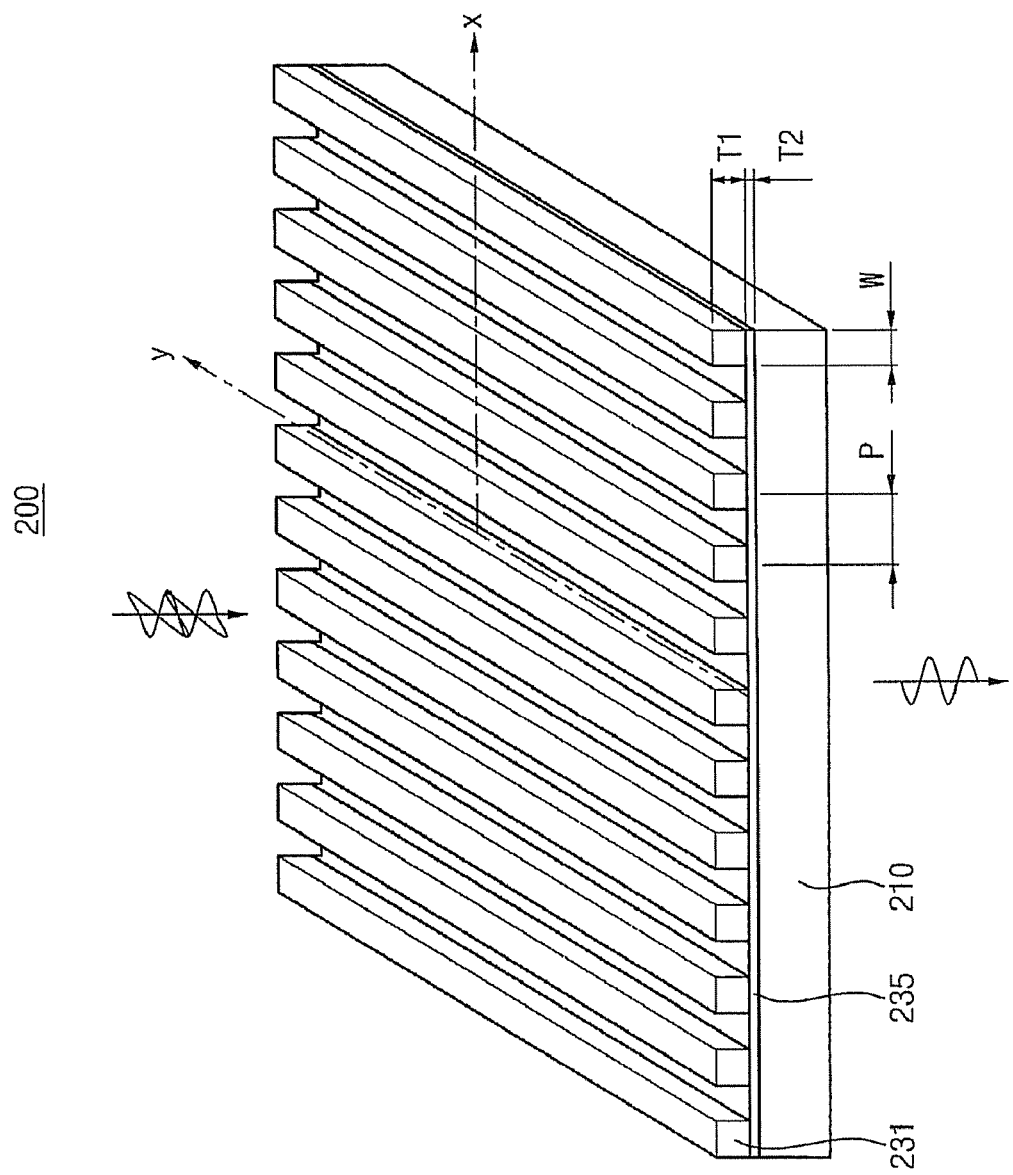
FIG. 6 is a perspective view illustrating an exemplary polarizing plate according to an exemplary embodiment of the present invention.

FIG. 6 is a perspective view illustrating an exemplary polarizing plate according to an exemplary embodiment of the present invention.

Referring to FIG. 6, a polarizing plate 200 includes a base layer 210, a plurality of conductive lattice lines 231, and a buffer layer 235. The polarizing plate 200 is substantially the same as the polarizing plate 5 illustrated in FIG. 1 except for the buffer layer 235.

In the present embodiment, the buffer layer 235 is substantially the same as the buffer layer 35 illustrated in FIG. 1 except that buffer layer 235 is totally formed, or substantially totally formed, on the first surface of the base layer 210. Therefore, the buffer layer 235 may include a metal layer such as a titanium (Ti) layer, a tungsten (W) layer, a niobium (Nb) layer, a tantalum (Ta) layer, a vanadium (V) layer and a chromium (Cr) layer. Furthermore, the buffer layer 235 may include an organic layer such as a silicon oxide (SiO2) layer, a silicon nitride (SiNx) layer, a thermosetting resin layer and a light curable resin layer. Further more, the buffer layer 235 may include a chromium oxide (CrOx) layer or a double-layer structure of metallic materials having different physical characteristics from each other.

When the buffer layer 235 is substantially fully formed on the base layer 210, a light-transmitting rate may be decreased. Therefore, the buffer layer 235 may be formed in a thin film having, for example, a thickness T2 of about 0.1 nm to about 10 nm to prevent a decrease of a light-transmitting ratio.

Display Panel

Figure 7:
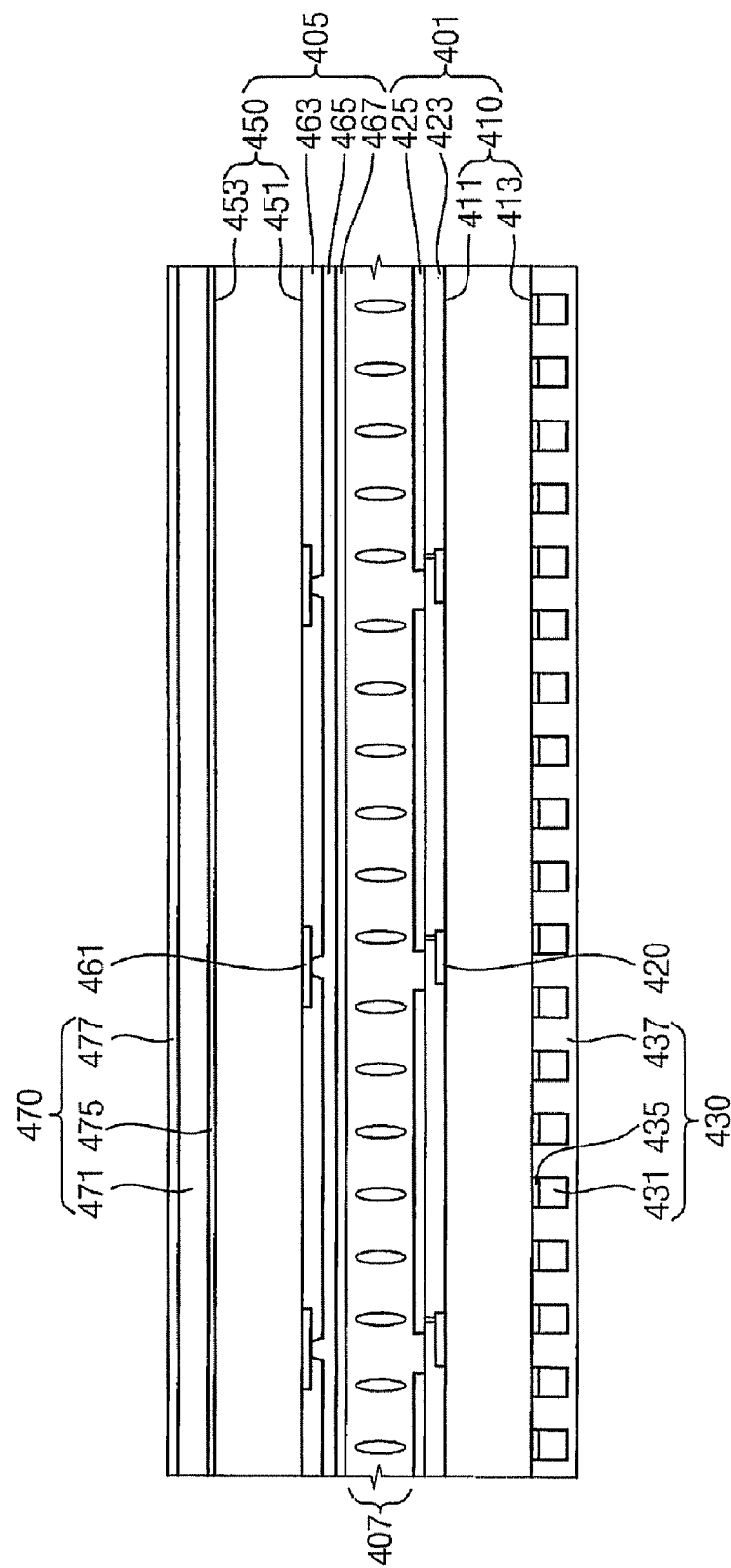
FIG. 7 is a cross-sectional view illustrating an exemplary display panel according to an exemplary embodiment of the present invention.

FIG. 7 is a cross-sectional view illustrating an exemplary display panel according to an exemplary embodiment of the present invention.

A polarizing plate having a buffer layer interposed between a base layer and conductive lattice lines, may be disposed on or below a display panel. For example, a glass substrate or a film such as PET may be used as the base layer. For another example, a substrate of the display panel may be used as the base layer.

Referring to FIG. 7, a display panel 400 includes an array substrate 401, an opposite substrate 405, a liquid crystal layer 407 and a first polarizing part 430.

The array substrate 401 includes a lower substrate 410 and a plurality of pixel parts.

The lower substrate 410 may includes a glass substrate with optically isotropic properties. A plurality of pixel parts is formed on an upper surface 411 of the lower substrate 410. A plurality of gate lines and a plurality of data lines are formed on the upper surface 411 of the lower substrate 410. The gate lines are formed in parallel with each other. The data lines that cross the gate lines are formed in a parallel with each other, and the data lines may extend substantially perpendicularly to the gate lines.

Each pixel part includes a switching element 420 and a pixel electrode 425.

The switching element 420 includes a gate electrode extending from the gate lines, a gate insulation layer formed on the gate electrode, a semiconductor layer formed on the gate insulation layer, a source electrode and a drain electrode. The source and drain electrodes are formed on the semiconductor layer. The source electrode is spaced apart from the drain electrode and may extend from the data lines. The pixel electrode 425 is formed on a protection layer 423 that protects the switching element 420. The pixel electrode 425 is extended along a contact hole formed in the protection layer 423 to be electrically connected to the drain electrode.

The opposite substrate 405 includes an upper substrate 450 and a plurality of color filter parts 463.

The upper substrate 450 may include a glass substrate with optically isotropic properties substantially the same as the lower substrate 410. The opposite substrate 405 may include a light-blocking layer 461, an overcoating layer 465 and a common electrode 467.

The light-blocking layer 461 is formed below a lower surface 451 of the upper substrate 450, and the light-blocking layer 461 has a plurality of openings formed therein, which correspond to each of the pixel electrodes 425. Color filter parts 463 are formed within the openings of the light-blocking layer 461, and may partially overlap the light-blocking layer 461. The overcoating layer 465 covers the color filter parts 463 and the light-blocking layer 461, and compensates for a stepped portion between the color filter parts 463 and the light-blocking layer 461. The common electrode 467 is formed on the overcoating layer 465.

The liquid crystal layer 407 is interposed between the array substrate 401 and the opposite substrate 405.

The first polarizing part 430 is formed on the lower surface 413 of the lower substrate 410. The first polarizing part 430 reflects and polarizes light entering the lower substrate 410. The polarizing-transmitted light by the first polarizing part 430 is incident to the liquid crystal layer 407 through the pixel electrodes 425. The first polarizing part 430 includes a plurality of first conductive lattice lines 431 and a first buffer layer 435.

The first conductive lattice lines 431 are substantially the same as the conductive lattice lines 31 illustrated in FIG. 1. The first conductive lattice lines 431 are formed on a lower surface 413 of the lower substrate 410 in a stripe shape. The first conductive lattice lines 431 may include aluminum (Al) or silver (Ag) having a superior light-reflecting rate and a low light-absorbing rate.

The first buffer layer 435 is substantially the same as the buffer layer 35 illustrated in FIG. 1. The first buffer layer 435 is formed between the lower substrate 410 and the first conductive lattice lines 431. The first buffer layer 435 directly contacts the lower surface 413 of the lower substrate 410 and the first conductive lattice lines 431, respectively. The first buffer layer 435 prevents a decrease of a light-reflecting rate of the first conductive lattice lines 431. The first buffer layer 435 may include a metal layer and an organic layer having superior characteristics as described with respect to FIGS. 4 and 5.

The first polarizing part 430 may further include a first planarization layer 437. The first planarization layer 437 may include a resin having a superior light-transmitting rate such as polycarbonate or a similar material. The first planarization layer 437 covers the first conductive lattice lines 431 and may further fill in the spaces between adjacent first conductive lattice lines 431. The first conductive lattice lines 431 and the first buffer layer 435 are filled up by the first planarization layer 437 to protect from damage such as external impacts, scratches, etc.

The display panel 400 may further include a second polarizing part 470 formed on the upper substrate 450.

The second polarizing part 470 reflects and polarizes light transmitting through the liquid crystal layer 407 and light entering to the upper substrate 450. The second polarizing part 470 includes a plurality of second conductive lattice lines 471 and a second buffer layer 475.

The second conductive lattice lines 471 are formed on the upper substrate 450 in a stripe shape. The second conductive lattice lines 471 may include aluminum (Al) or silver (Ag).

The second buffer layer 475 is interposed between the upper substrate 450 and the second conductive lattice lines 471. The second buffer layer 475 makes contact with an upper surface 453 of the upper substrate 450 and the second conductive lattice lines 471, respectively. The second buffer layer 475 may prevent a decrease of a light-reflecting rate of the second conductive lattice lines 471. The second buffer layer 475 may include a metal layer, an organic layer, etc. as described with respect to FIGS. 4 and 5.

The second polarizing part 470 may further include a second planarization layer 477. The second planarization layer 477 covers the second conductive lattice lines 471, and may further cover the spaces between adjacent second conductive lattice lines 471. The second conductive lattice lines 471 and the second buffer layer 475 are filled up by the second planarization layer 477 to protect from damage such as external impacts, scratches, etc.

A pitch, a line width and a thickness of the first conductive lattice lines 431 and the second conductive lattice lines 471 are substantially equal to the pitch P, the line width W and the thickness T1 of the conductive lattice lines 31, respectively, as shown in and described with respect to FIG. 1.

For example, a polarizing direction of the first conductive lattice lines 431 and a polarizing direction of the conductive lattice lines 471 may be disposed perpendicular to each other, in parallel with each other or with a predetermined angle. In an exemplary embodiment, when the liquid crystal layer 407 is vertically aligned and driven in a normally black mode, as shown in FIG. 7, the first conductive lattice lines 431 may be disposed at about zero degrees with respect to a reference direction and the second conductive lattice lines 471 may be disposed at about 90 degrees with respect to the reference direction. In another exemplary embodiment, when the liquid crystal layer 407 is vertically aligned and driven in a normally white mode, the first conductive lattice lines 431 and the second conductive lattice lines 471 may be disposed in parallel with each other.

In another exemplary embodiment, when the liquid crystal layer 407 has a twisted nematic type, the first conductive lattice lines 431 and the second conductive lattice lines 471 may be disposed perpendicular to each other, so that the liquid crystal layer 407 may be driven in a normally white mode. Furthermore, the first conductive lattice lines 431 and the second conductive lattice lines 471 may be disposed in parallel with each other, so that the liquid crystal layer 407 may be driven in a normally black mode.

The p-polarized light of the incident randomly polarized light that is incident to the lower substrate 410 transmits through the first conductive lattice lines 431, and the s-polarized light of the incident randomly polarized light is reflected by the first conductive lattice lines 431. The p-polarized light is incident to the liquid crystal layer 407 through the pixel electrode 425. The reflected s-polarized light is polarized into randomly polarized light due to a reflection of an optical sheet disposed below the display panel 400, and then is again reflected and polarized by the first conductive lattice lines 431.

As shown in FIG. 7, when an electric field is not formed between the pixel electrode 425 and the common electrode 467 so that the liquid crystal layer 407 is aligned in a vertical direction when viewed from a cross-section of the display panel 400, the p-polarized light incident to the liquid crystal layer 407 maintains a polarizing axis. At this time, the second conductive lattice lines 471 reflect the p-polarized light.

When an electric field is formed between the pixel electrode 425 and the common electrode 467 so that the liquid crystal layer 407 is inclined when viewed from a cross-section of the display panel 400, a polarizing axis of the p-polarized light incident to the liquid crystal layer 407 is rotated to be converted into s-polarized light. At this time, the s-polarized light transmits through the second conductive lattice lines 471 disposed to be perpendicular to the first conductive lattice lines 431.

The light incident into the first and second conductive lattice lines 431 and 471 may include UV light. The first and second buffer layers 435 and 475 may prevent a decrease of a light-reflecting rate for visible light of the first and second conductive lattice lines 431 and 471 by the UV light. That is, the first and second buffer layers 435 and 475 may prevent an increase of a light-absorbing rate.

Figure 8:
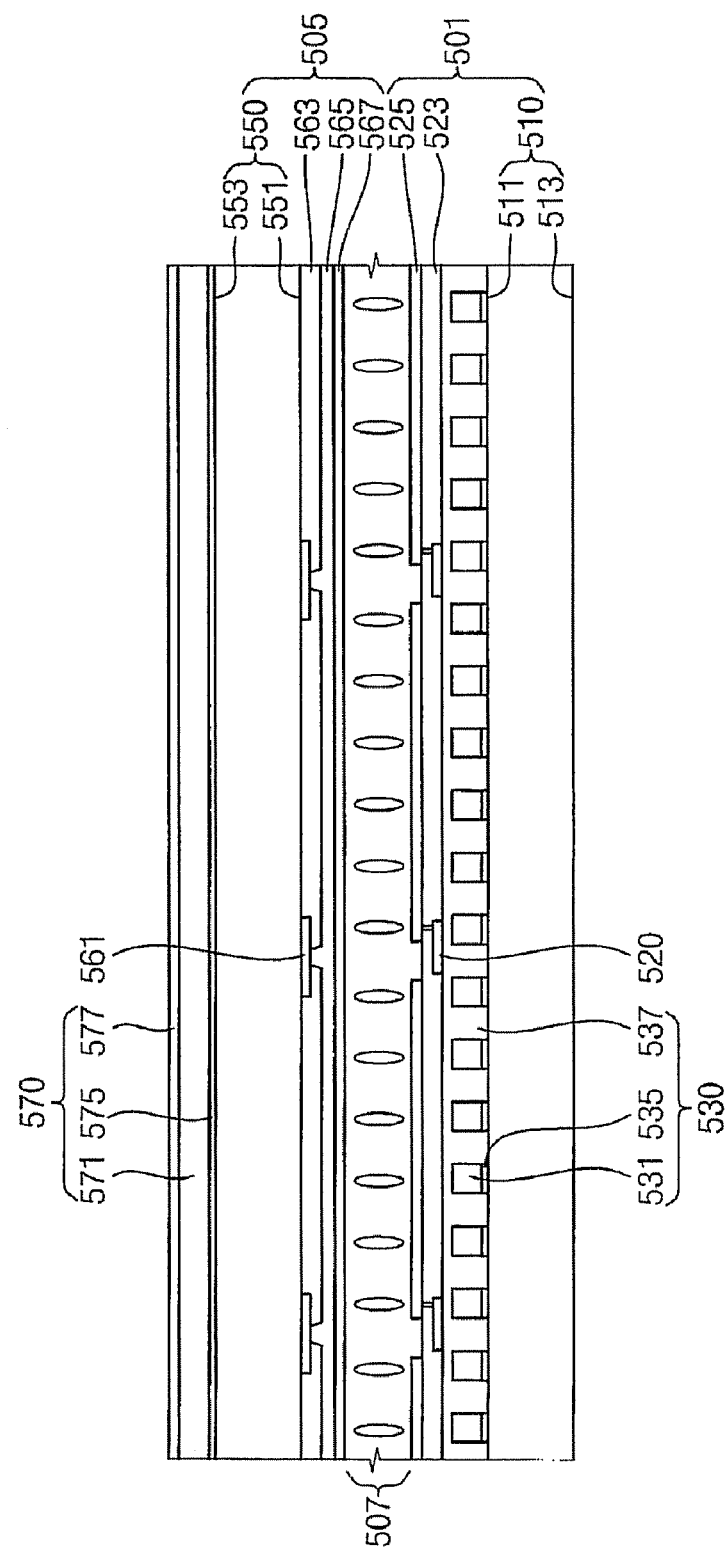
FIG. 8 is a cross-sectional view illustrating an exemplary display panel according to an exemplary embodiment of the present invention.

FIG. 8 is a cross-sectional view illustrating an exemplary display panel according to an exemplary embodiment of the present invention.

Referring to FIG. 8, a display panel 500 includes an array substrate 501, an opposite substrate 505, a liquid crystal layer 507, a first polarizing part 530 and a second polarizing part 570.

The display panel 500 is substantially the same as the display panel 400 as shown in FIG. 7 except for a position of the first polarizing part 530.

The array substrate 501 includes a lower substrate 510 and a plurality of pixel parts including the switching element 520, the protection layer 523, and the pixel electrode 525.

In the present exemplary embodiment, the first polarizing part 530 is formed on an upper surface 511 of the lower substrate 510. The first polarizing part 530 includes a plurality of first conductive lattice lines 531, a first buffer layer 535 and a first planarization layer 537.

The first buffer layer 535 is formed on the upper surface 511 of the lower substrate 510 in a stripe shape with a thickness ranging from a few to tens of nanometers. The first conductive lattice lines 531 are formed on the first buffer layer 535. Therefore, the first conductive lattice lines 531 are patterned in a stripe shape along the first buffer layer 535. The first buffer layer 535 makes contact with the lower substrate 510 and the first conductive lattice lines 531, respectively. The first planarization layer 537 covers the first conductive lattice lines 531 and spaces between the first conductive lattice lines 531 to form a planarized surface.

A plurality of gate lines and a plurality of data lines are formed on the first planarization layer 537. For example, a plurality of pixel areas may be defined on the lower substrate 510. Each of the pixel parts may be formed in the pixel areas, respectively.

The opposite substrate 505 may include upper substrate 550, light blocking layer 561, color filter parts 563, overcoating layer 565, and common electrode 567. The upper substrate 550 may include lower surface 551 and upper surface 553. The second polarizing part 570, formed on the upper surface 553 of the upper substrate 550, may include a second buffer layer 575, second conductive lattice lines 571, and a second planarization layer 577. A liquid crystal layer 507 may be interposed between the opposite substrate 505 and the array substrate 501.

In the present exemplary embodiment, the incident light to the lower surface 513 of the lower substrate 510 is incident into the first buffer layer 535 before the first conductive lattice lines 531. The first buffer layer 535 may prevent a variation of a formation of the interface between the first conductive lattice lines 531 due to high-energy light such as UV light.

Figure 9:
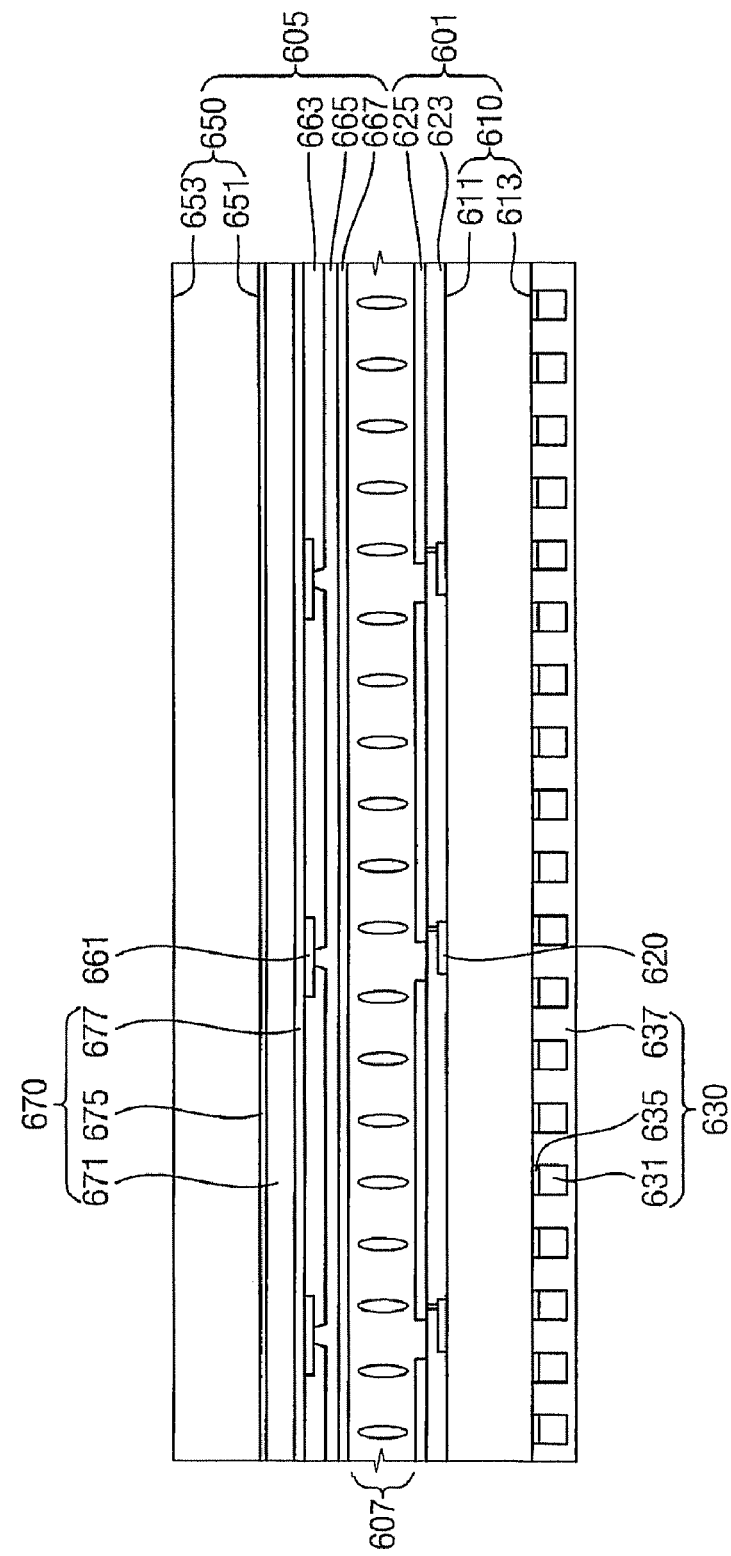
FIG. 9 is a cross-sectional view illustrating an exemplary display panel according to an exemplary embodiment of the present invention.

FIG. 9 is a cross-sectional view illustrating an exemplary display panel according to an exemplary embodiment of the present invention.

Referring to FIG. 9, a display panel 600 includes an array substrate 601, an opposite substrate 605, a liquid crystal layer 607, a first polarizing part 630 and a second polarizing part 670. The array substrate 601 may include lower substrate 610 having lower surface 613 and upper surface 611. Pixel parts including, in part, switching elements 620, protection layer 623, and pixel electrodes 625 are formed on the upper surface 611 of the lower substrate 610. The first polarizing part 630 includes first conductive lattice lines 631, first buffer layer 635, and first planarization layer 637 and is formed on the lower surface 613 of the lower substrate 610.

The display panel 600 is substantially the same as the display panel 400 as shown in FIG. 7 except for a position of the second polarizing part 670.

The opposite substrate 605 includes an upper substrate 650 and a plurality of color filter parts 663.

In the present embodiment, the second polarizing part 670 is formed on the upper substrate 650. The second polarizing part 670 includes a plurality of second conductive lattice lines 671, a second buffer layer 675 and a second planarization layer 677. The second buffer layer 675 is formed on a lower surface 651 of the upper substrate 650 in a stripe shape with a thickness ranging from a few to tens of nanometers, instead of on an upper surface 653 of the upper substrate 650.

The second conductive lattice lines 671 are formed on the second buffer layer 675. Therefore, the second conductive lattice lines 671 are patterned in a stripe shape along the second buffer layer 675. The second buffer layer 675 makes contact with the upper substrate 650 and the second conductive lattice lines 671, respectively. The second planarization layer 677 covers the second conductive lattice lines 671 to form a planarized surface.

A light-blocking layer 661, a color filter part 663, an overcoating layer 665 and a common electrode 667 are formed on the second planarization layer 677.

Figure 10:
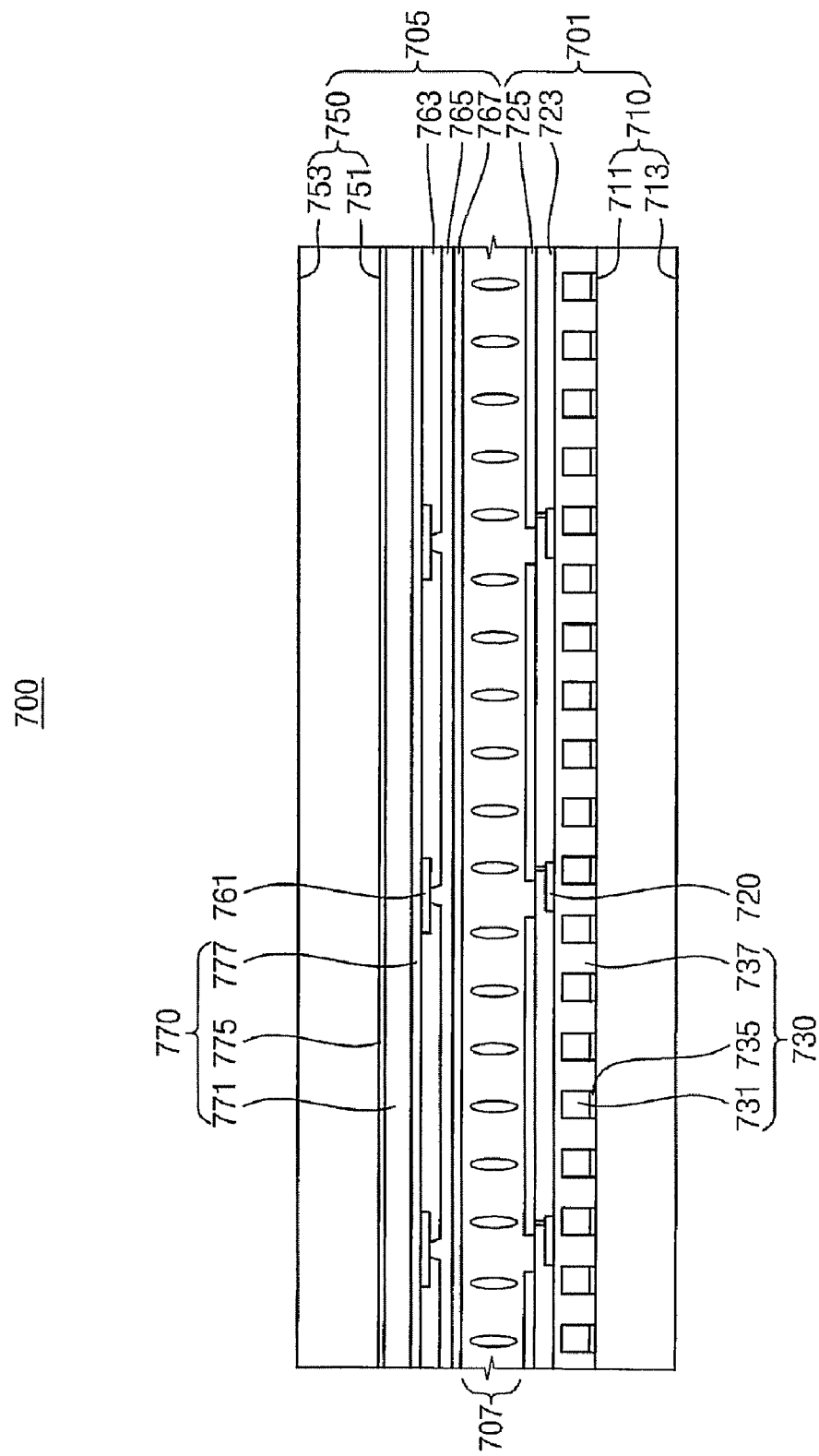
FIG. 10 is a cross-sectional view illustrating an exemplary display panel according to an exemplary embodiment of the present invention.

FIG. 10 is a cross-sectional view illustrating an exemplary display panel according to an exemplary embodiment of the present invention.

Referring to FIG. 10, a display panel 700 includes an array substrate 701, an opposite substrate 705, a liquid crystal layer 707, a first polarizing part 730 and a second polarizing part 770. The array substrate 701 includes a lower substrate 710, having an upper surface 711 and a lower surface 713, and pixel parts including, in part, switching elements 720, a protection layer 723, and pixel electrodes 725. The opposite substrate 705 includes an upper substrate 750 having an upper surface 753 and a lower surface 751, a light blocking layer 761, color filter parts 763, an overcoating layer 765, and a common electrode 767. The first polarizing part 730 includes first conductive lattice lines 731, first buffer layer 735, and a first planarization layer 737. The second polarizing part 770 includes second conductive lattice lines 771, second buffer layer 775, and second planarization layer 777.

The display panel 700 is substantially the same as the display panel 400 as shown in FIG. 7 except for a position of the first and second polarizing parts 730, 770.

In the present embodiment, the first polarizing part 730 is formed on the lower substrate 710, and the second polarizing part 770 is formed on the lower surface 751 of the upper substrate 750.

The first and second polarizing parts 730 and 770 are interposed between the lower substrate 710 of the array substrate 701 and the upper substrate 750 of the opposite substrate 705, so that the first and second polarizing parts 730 and 770 are protected from damage by external impacts, scratches, etc.

Display Device

Figure 11:
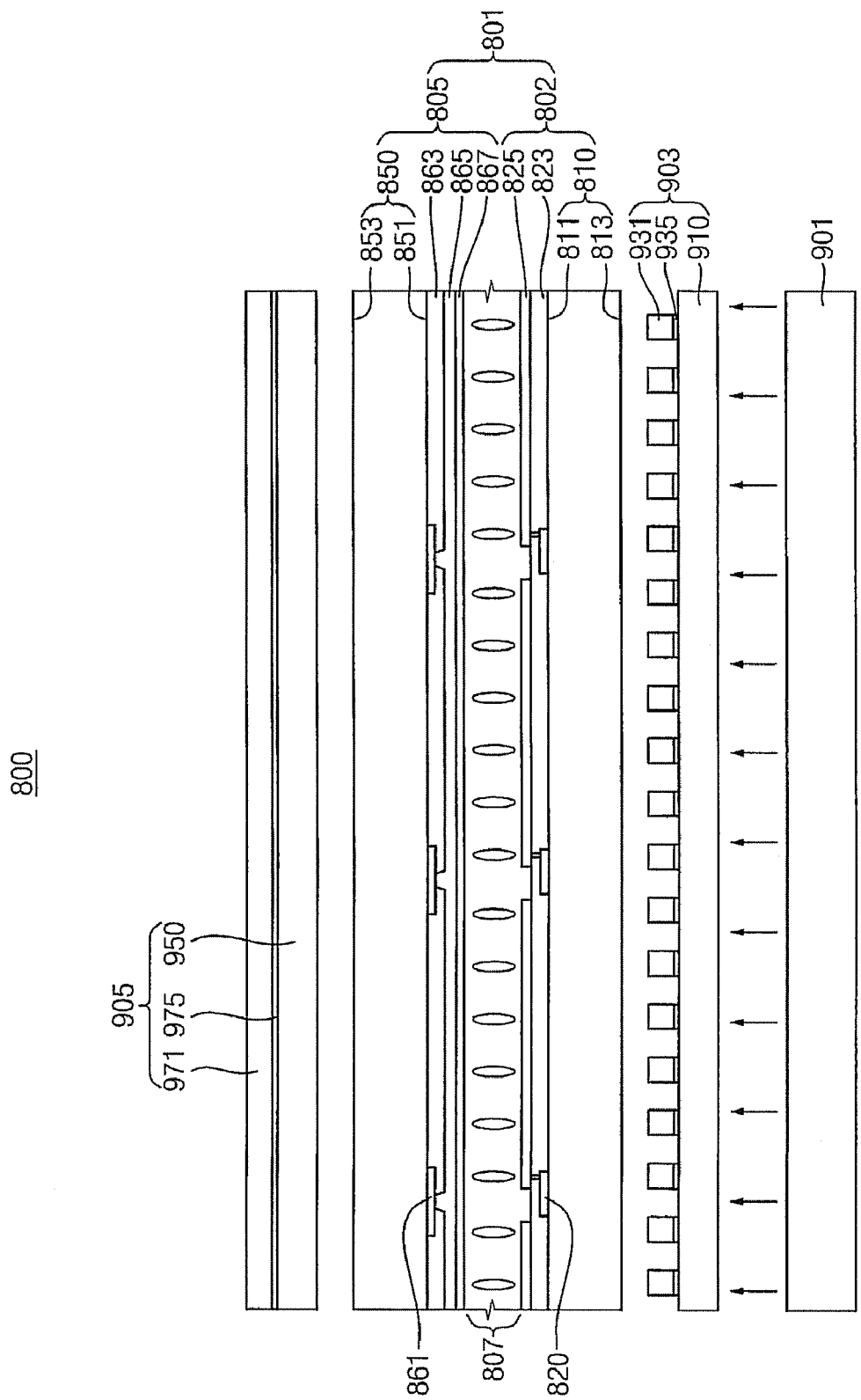
FIG. 11 is a cross-sectional view illustrating an exemplary display device according to an exemplary embodiment of the present invention.

FIG. 11 is a cross-sectional view illustrating an exemplary display device according to an exemplary embodiment of the present invention.

Referring to FIG. 11, a display device 800 includes a display panel 801, a backlight part 901, a first polarizing plate 903, and a second polarizing plate 905. The display panel 801 includes an array substrate 802, an opposite substrate 805 and a liquid crystal layer 807. The array substrate 802, the opposite substrate 805 and the liquid crystal layer 807 are substantially the same as the array substrate 401, the opposite substrate 405 and the liquid crystal layer 407 as shown in FIG. 7, respectively. The array substrate 802 includes a lower substrate 810, having an upper surface 811 and a lower surface 813, and pixel parts including, in part, switching elements 820, a protection layer 823, and pixel electrodes 825. The opposite substrate 805 includes an upper substrate 850 having an upper surface 853 and a lower surface 851, a light blocking layer 861, color filter parts 863, an overcoating layer 865, and a common electrode 867.

The backlight part 901 is disposed below the array substrate 802 to emit light to the array substrate 802. The backlight part 901 may include a cold cathode fluorescent lamp ("CCFL") and a light source such as a light-emitting diode ("LED"). The light emitted from the light source may include visible light and UV light.

In the present embodiment, the first polarizing plate 903 is an additional member that is physically isolated from the display panel 801. The first polarizing plate 903 is interposed between the array substrate 802 and the backlight part 901. The first polarizing plate 903 includes a first base layer 910, a plurality of first conductive lattice lines 931 and a first buffer layer 935. The first polarizing plate 903 is substantially the same as the polarizing plate 5 shown in FIG. 1.

Therefore, the first buffer layer 935 is formed on the first base layer 910 in a stripe shape. The first conductive lattice lines 931 are formed on the first buffer layer 935 in the same pattern.

The display device 800 may further include a second polarizing plate 905. The second polarizing plate 905 is disposed on the opposite substrate 805. The second polarizing plate 905 includes a second base substrate 950, a plurality of second conductive lattice lines 971 and a second buffer layer 975. The second polarizing plate 905 is substantially the same as the first polarizing plate 903.

The first and second buffer layers 935 and 975 may prevent a decrease of a light-reflecting rate for visible light of the first and second conductive lattice lines 931 and 971. That is, the first and second buffer layers 935 and 975 may prevent an increase of a light-absorbing rate of visible light. As a result, a polarized transmission rate of the first and second polarizing plates 903 and 905 is prevented from decreasing in accordance to a time, so that display quality may be enhanced.

While particular exemplary embodiments of a display panel and a display device have been illustrated and described, it should be understood that alternate exemplary embodiments would also be within the scope of these embodiments. For example, any of the exemplary embodiments of a display panel and a display device may include a buffer layer similar to buffer layer 235 as shown in FIG. 6.

As described above, according to the present invention, a buffer layer including a material selected by an experiment may prevent the conductive lattice lines from being exposed to UV light for a long time, so as to prevent a light-reflecting rate of the conductive lattice lines from being decreased or a light-absorbing rate from being increased. Therefore, the lifetime of a polarizing plate including the conductive lattice lines as a polarizing element may be increased. Furthermore, a reduction of a polarized transmission rate of the polarizing plate may be restrained in accordance to a time, so that the display quality of the display device may be enhanced.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A polarizing plate comprising:
a base layer;
a buffer layer disposed on the base layer; and
conductive lattice lines disposed on the buffer layer in a stripe shape to reflect and polarize incident light,
wherein the buffer layer protects the conductive lattice lines, and
the buffer layer comprises:
at least one selected from the group consisting of tungsten, niobium, tantalum, vanadium and chromium;
a chromium oxide layer; and
an organic material layer.

2. The polarizing plate of claim 1, wherein the conductive lattice lines comprise one of a silver layer and an aluminum layer.

3. The polarizing plate of claim 1, wherein the organic material layer comprises at least one of a silicon oxide layer, a silicon nitride layer, a thermosetting resin layer, and a light curable resin layer.

4. The polarizing plate of claim 2, wherein the buffer layer is patterned along the conductive lattice lines.

5. A polarizing plate comprising:
a base layer;
a buffer layer disposed on the base layer; and
conductive lattice lines disposed on the buffer layer in a stripe shape to reflect and polarize incident light,
wherein the buffer layer protects the conductive lattice lines, and
the buffer layer comprises:
at least one selected from the group consisting of tungsten, niobium, tantalum, vanadium and chromium; and
an organic material layer,
wherein the buffer layer is substantially fully formed on the base layer.

6. The polarizing plate of claim 5, wherein the buffer layer has a thickness in a range of about 0.1 nm to about 10 nm.

7. A polarizing plate comprising:
a base layer;
a buffer layer disposed on the base layer; and
conductive lattice lines disposed on the buffer layer in a stripe shape to reflect and polarize incident light,
wherein the buffer layer protects the conductive lattice lines, and
the buffer layer comprises:
at least one selected from the group consisting of tungsten, niobium, tantalum, vanadium and chromium; and
an organic material layer,
wherein a pitch between the conductive lattice lines is in a range of about 100 nm to about 200 nm, each of the conductive lattice lines has a width in a range of about 50 nm to about 100 nm, and each of the conductive lattice lines has a thickness in a range of about 150 nm to about 250 nm.

8. A display panel comprising:
an array substrate including a plurality of pixel parts disposed thereon;
an opposite substrate including a plurality of color filter parts facing the pixel parts;

a liquid crystal layer interposed between the array substrate and the opposite substrate; and a first polarizing part comprising first conductive lattice lines and a first buffer layer, the first conductive lattice lines disposed on the array substrate in a stripe shape to reflect and polarize incident light, the first buffer layer disposed between the array substrate and the first conductive lattice lines to protect the first conductive lattice lines, wherein the first polarizing part is disposed on an upper surface of the array substrate, and the upper surface is closer to the liquid crystal layer than an opposite, lower surface of the array substrate.

9. The display panel of claim 8, further comprising a second polarizing part including:

second conductive lattice lines disposed on the opposite substrate in a stripe shape to reflect and polarize incident light; and a second buffer layer disposed between the opposite substrate and the second conductive lattice lines to protect the second conductive lattice lines.

10. The display panel of claim 9, wherein the second conductive lattice lines are disposed on an upper surface of the opposite substrate, and the second buffer layer is disposed between the upper surface of the opposite substrate and the second conductive lattice lines.

11. The display panel of claim 9, wherein the second conductive lattice lines are formed on a lower surface of the opposite substrate, and the second buffer layer is disposed between the lower surface of the opposite substrate and the second conductive lattice lines.

12. A display device comprising:

a display panel comprising an array substrate including a plurality of pixel parts disposed thereon, an opposite substrate including a plurality of color filter parts facing the pixel parts, and a liquid crystal layer interposed between the array substrate and the opposite substrate;

a backlight section which provides the array substrate with light; and a first polarizing plate comprising a first base layer disposed between the backlight part and the array substrate, a plurality of first conductive lattice lines disposed on the first base layer, and a first buffer layer disposed between the first base layer and the first conductive lattice lines to protect the first conductive lattice lines, wherein the first buffer layer includes at least one selected from the group consisting of tungsten, niobium, tantalum, vanadium and chromium.

13. The display device of claim 12, further comprising a second polarizing plate including:

a second base layer disposed on the opposite substrate;

a plurality of second conductive lattice lines disposed on the second base layer; and a second buffer layer disposed between the second base layer and the second conductive lattice lines to protect the second conductive lattice lines.

* * * * *